(12) United States Patent
Lee et al.

(10) Patent No.: US 10,736,171 B2
(45) Date of Patent: Aug. 4, 2020

(54) METHOD AND APPARATUS FOR PERFORMING EXTENDED DRX OPERATION BASED ON UPLINK INDICATION IN WIRELESS COMMUNICATION SYSTEM

(71) Applicant: LG ELECTRONICS INC., Seoul (KR)

(72) Inventors: Youngdae Lee, Seoul (KR); Jaewook Lee, Seoul (KR); Sunghoon Jung, Seoul (KR); Jinsook Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 21 days.

(21) Appl. No.: 15/565,568

(22) PCT Filed: Apr. 18, 2016

(86) PCT No.: PCT/KR2016/003981
§ 371 (c)(1),
(2) Date: Oct. 10, 2017

(87) PCT Pub. No.: WO2016/167615
PCT Pub. Date: Oct. 20, 2016

(65) Prior Publication Data
US 2018/0124864 A1    May 3, 2018

Related U.S. Application Data

(60) Provisional application No. 62/148,193, filed on Apr. 16, 2015.

(51) Int. Cl.
*H04W 76/28* (2018.01)
*H04W 76/20* (2018.01)
(Continued)

(52) U.S. Cl.
CPC ....... *H04W 76/28* (2018.02); *H04W 28/0278* (2013.01); *H04W 52/0209* (2013.01);
(Continued)

(58) Field of Classification Search
CPC ..... H04W 76/28; H04W 76/20; H04W 76/34; H04W 28/0278
See application file for complete search history.

(56) References Cited

U.S. PATENT DOCUMENTS

2008/0186892 A1* 8/2008 Damnjanovic ... H04W 52/0216
370/311
2008/0198795 A1* 8/2008 Kim ................. H04W 72/0406
370/328
(Continued)

FOREIGN PATENT DOCUMENTS

WO    2011157159 A2    12/2011
WO    2014198479 A1    12/2014

OTHER PUBLICATIONS

U.S. Appl. No. 62/116,819, filed Feb. 2015, Vajapeyam; Madhavan Srinivasan.*
(Continued)

*Primary Examiner* — Jael M Ulysse
(74) *Attorney, Agent, or Firm* — Dentons US LLP (57) ABSTRACT

A method and apparatus for transmitting an uplink indication for extended discontinuous reception (eDRX) in a wireless communication system is provided. A user equipment (UE) detects that an event related to eDRX occurs, and transmits an uplink indication related to eDRX to a network. When the event related to eDRX is that an eDRX timer expires or an eDRX command indicating stop of eDRX is received, the uplink indication may indicate stop of eDRX.
(Continued)

When the event related to eDRX is that no uplink data is to be transmitted, the uplink indication may indicate start of eDRX.

8 Claims, 8 Drawing Sheets

(51) Int. Cl.
    *H04W 52/02* (2009.01)
    *H04W 76/34* (2018.01)
    *H04W 28/02* (2009.01)
    *H04W 72/12* (2009.01)

(52) U.S. Cl.
    CPC ... *H04W 52/0216* (2013.01); *H04W 72/1284* (2013.01); *H04W 76/20* (2018.02); *H04W 76/34* (2018.02); *Y02D 70/00* (2018.01); *Y02D 70/1224* (2018.01); *Y02D 70/1226* (2018.01); *Y02D 70/1242* (2018.01); *Y02D 70/1262* (2018.01); *Y02D 70/142* (2018.01); *Y02D 70/146* (2018.01); *Y02D 70/21* (2018.01); *Y02D 70/23* (2018.01); *Y02D 70/24* (2018.01)

(56) References Cited

U.S. PATENT DOCUMENTS

| | | | | |
|---|---|---|---|---|
| 2008/0268863 A1* | 10/2008 | Pedersen | ............... | H04L 1/0027 455/452.2 |
| 2008/0273492 A1* | 11/2008 | Jeong | ............... | H04W 76/38 370/329 |
| 2008/0287149 A1* | 11/2008 | Womack | ............... | H04W 76/28 455/466 |
| 2009/0016252 A1* | 1/2009 | Ho | ............... | H04W 52/0283 370/311 |
| 2009/0052361 A1* | 2/2009 | Cai | ............... | H04L 1/18 370/311 |
| 2009/0168731 A1* | 7/2009 | Zhang | ............... | H04L 1/1854 370/336 |
| 2009/0175186 A1* | 7/2009 | Du | ............... | H04W 76/28 370/252 |
| 2009/0232054 A1* | 9/2009 | Wang | ............... | H04W 52/0225 370/328 |
| 2009/0285141 A1* | 11/2009 | Cai | ............... | H04W 52/0251 370/311 |
| 2009/0316575 A1* | 12/2009 | Gholmieh | ............... | H04W 76/28 370/225 |
| 2010/0002612 A1 | 1/2010 | Hsu et al. | | |
| 2010/0130237 A1* | 5/2010 | Kitazoe | ............... | H04W 76/28 455/458 |
| 2010/0144299 A1* | 6/2010 | Ren | ............... | H04B 1/1615 455/226.1 |
| 2010/0290509 A1* | 11/2010 | Dalsgaard | ............... | H04W 76/28 375/220 |
| 2010/0322173 A1* | 12/2010 | Marinier | ............... | H04L 5/001 370/329 |
| 2011/0002281 A1* | 1/2011 | Terry | ............... | H04W 52/0216 370/329 |
| 2011/0032924 A1* | 2/2011 | Lee | ............... | H04W 76/28 370/345 |
| 2011/0038348 A1* | 2/2011 | Borsella | ............... | G10H 1/361 370/331 |
| 2011/0170420 A1* | 7/2011 | Xi | ............... | H04L 5/001 370/241 |
| 2011/0205928 A1* | 8/2011 | Pelletier | ............... | H04L 1/1883 370/252 |
| 2011/0237231 A1* | 9/2011 | Horneman | ............... | H04W 52/0216 455/414.1 |
| 2011/0319076 A1* | 12/2011 | Ramasamy | ............... | H04W 48/16 455/434 |
| 2012/0236834 A1* | 9/2012 | Ho | ............... | H04W 52/0216 370/337 |
| 2012/0257522 A1* | 10/2012 | Adachi | ............... | H04W 52/0229 370/252 |
| 2012/0257557 A1* | 10/2012 | Yamazaki | ............... | H04W 52/0229 370/311 |
| 2013/0039347 A1* | 2/2013 | Moqvist | ............... | H04W 72/1268 370/335 |
| 2013/0045770 A1* | 2/2013 | Aschan | ............... | H04W 52/0216 455/522 |
| 2013/0163497 A1* | 6/2013 | Wei | ............... | H04L 5/0007 370/311 |
| 2013/0223311 A1* | 8/2013 | Wang | ............... | H04L 5/0091 370/311 |
| 2013/0229931 A1* | 9/2013 | Kim | ............... | H04W 48/08 370/252 |
| 2013/0258919 A1* | 10/2013 | Damnjanovic | ... | H04W 52/0209 370/311 |
| 2013/0294307 A1* | 11/2013 | Johansson | ............... | H04W 52/0209 370/311 |
| 2013/0301421 A1* | 11/2013 | Yi | ............... | H04W 52/0216 370/241 |
| 2013/0315122 A1* | 11/2013 | Sirotkin | ............... | H04W 4/70 370/311 |
| 2014/0022974 A1* | 1/2014 | Eriksson | ............... | H04W 56/0005 370/311 |
| 2014/0029459 A1* | 1/2014 | Kwon | ............... | H04W 76/28 370/252 |
| 2014/0198701 A1* | 7/2014 | Ostergaard | ............... | H04W 52/0209 370/311 |
| 2014/0247742 A1 | 9/2014 | Lee et al. | | |
| 2014/0247765 A1* | 9/2014 | Baghel | ............... | H04W 52/0203 370/311 |
| 2014/0295820 A1* | 10/2014 | Kim | ............... | H04W 52/0216 455/418 |
| 2015/0003311 A1* | 1/2015 | Feuersaenger | .... | H04W 52/0225 370/311 |
| 2015/0036489 A1 | 2/2015 | Rajadurai et al. | | |
| 2015/0092707 A1 | 4/2015 | Kwon | | |
| 2016/0242231 A1* | 8/2016 | Vajapeyam | ............... | H04W 24/08 |

OTHER PUBLICATIONS

3GPP TS 36300 V12.5.0; "3rd Generation Partnership Project-;Technical Specification Group Radio Access Network; Evolved Universal Terrestrial Radio Access (E-UTRA) and Evolved Universal Terrestrial Radio Access Network (E-UTRAN);Overall description;Stage 2 (Release 12)".

Huawei et al., "Discussion on Extended DRX cycle mechanism", R2-150508, 3GPP TSG-RAN WG2 Meeting #89 Jan. 31, 2015.

\* cited by examiner

METHOD AND APPARATUS FOR PERFORMING EXTENDED DRX OPERATION BASED ON UPLINK INDICATION IN WIRELESS COMMUNICATION SYSTEM

CROSS-REFERENCE TO RELATED APPLICATIONS

This application is the National Stage filing under 35 U.S.C. 371 of International Application No. PCT/KR2016/003981, filed on Apr. 18, 2016, which claims the benefit of U.S. Provisional Application No. 62/148,193 filed on Apr. 16, 2015, the contents of which are all hereby incorporated by reference herein in their entirety.

BACKGROUND OF THE INVENTION

Field of the Invention

The present invention relates to wireless communications, and more particularly, to a method and apparatus for performing an extended discontinuous reception (eDRX) operation based on an uplink indication in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Power consumption is important for UEs using battery or an external power supply and its importance increases with the continued growth of device populations and more demanding use cases. The importance can be illustrated by following scenarios, e.g.:

For machine-to-machine (M2M) use cases like sensors that run on battery, it is a major cost to on site exchange (or charge) the batteries for a large amount of devices and the battery lifetime may even determine the device's lifetime if it is not foreseen to charge or replace the battery;

Even for scenarios where UEs may consume power from an external power supply, it may be desirable to consume less power for energy efficiency purposes.

For reducing power consumptions, 3GPP had introduced concept of discontinuous reception (DRX). DRX is a method used in mobile communication to conserve the battery of the mobile device. The mobile device and the network negotiate phases in which data transfer occurs. During other times, the device turns its receiver off and enters a low power state. Further, 3GPP has introduced a power saving mode which is configured and controlled by non-access stratum (NAS) that allows the UE to reduce its power consumption.

Machine-type communication (MTC) is an important revenue stream for operators and has a huge potential from the operator perspective. There are several industry for a working on an efficient machine-to-machine (M2M) system with some industry members developing a new access technology dedicated for MTC. However, it is more efficient for operators to be able to serve MTC user equipment (UE) using already deployed radio access technology. Therefore it is important for operators to understand whether LTE could be a competitive radio access technology for efficient support of MTC. It is envisaged that MTC UE's will be deployed in huge numbers, large enough to create an ecosystem on its own. Lowering the cost of MTC UE's is an important enabler for implementation of the concept of "internet of things". MTC UE's used for many applications will require low operational power consumption and are expected to communicate with infrequent small burst transmissions.

DRX or PSM described above may be not enough for reducing power consumption in MTC or various other features. An extended DRX (eDRX) operation has been discussed, and accordingly, enhancement of eDRX operation may be required.

SUMMARY OF THE INVENTION

The present invention provides a method and apparatus for performing an extended discontinuous reception (eDRX) operation based on an uplink indication in a wireless communication system. The present invention provides a method and apparatus for transmitting an uplink indication related to eDRX to a network.

In an aspect, a method for transmitting, by a user equipment (UE), an uplink indication for extended discontinuous reception (eDRX) in a wireless communication system is provided. The method includes detecting that an event related to eDRX occurs, and transmitting an uplink indication related to eDRX to a network.

In another aspect, a user equipment (UE) in a wireless communication system is provided. The UE includes a memory, a transceiver, and a processor coupled to the memory and the transceiver. The processor is configured to detect that an event related to extended discontinuous reception (eDRX) occurs, and control the transceiver to transmit an uplink indication related to eDRX to a network.

An eDRX operation can be performed efficiently based on an uplink indication transmitted by a user equipment (UE).

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
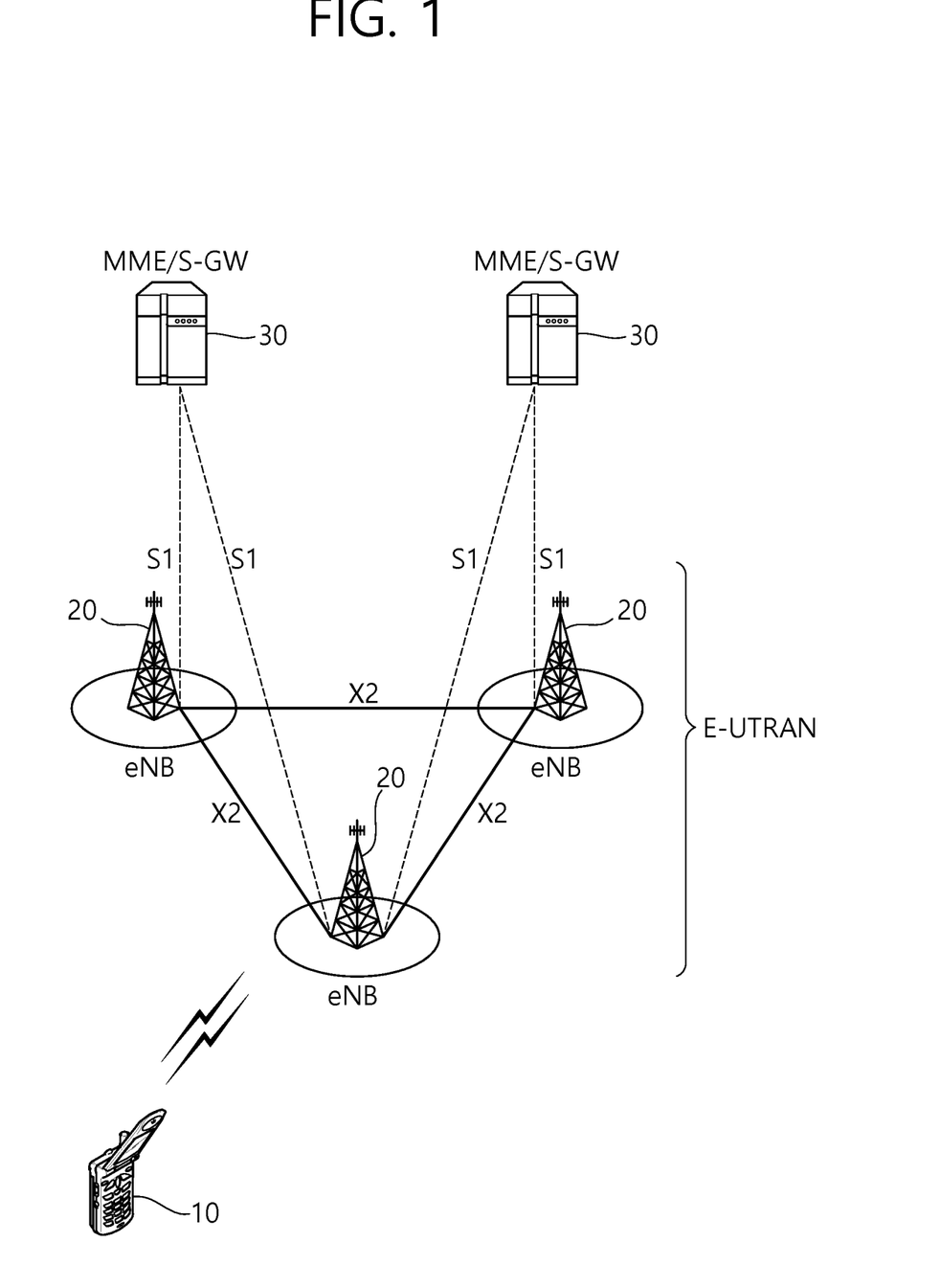
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
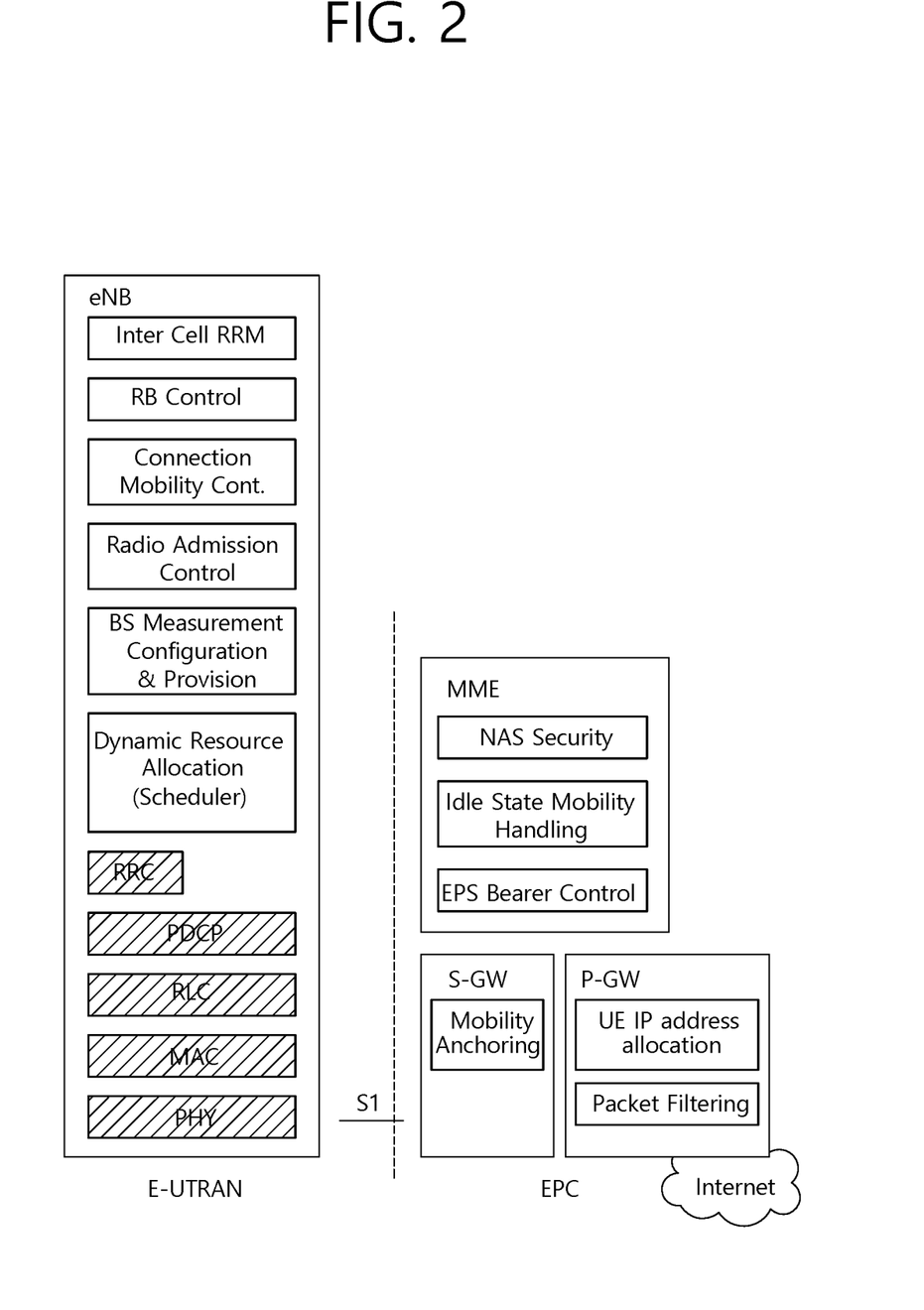
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
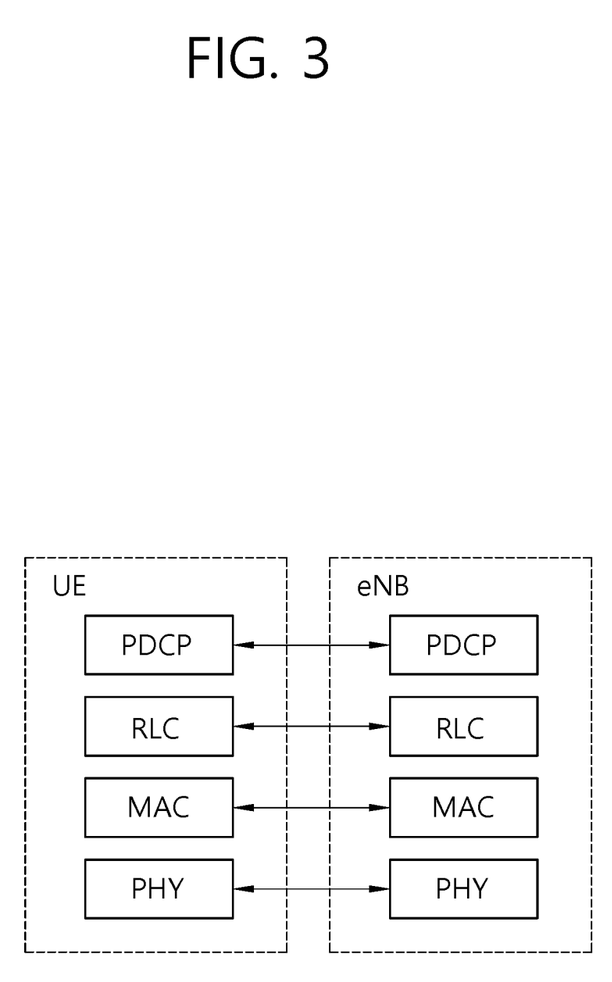
FIG. 3 shows a block diagram of a user plane protocol stack of an LTE system.
Figure 4:
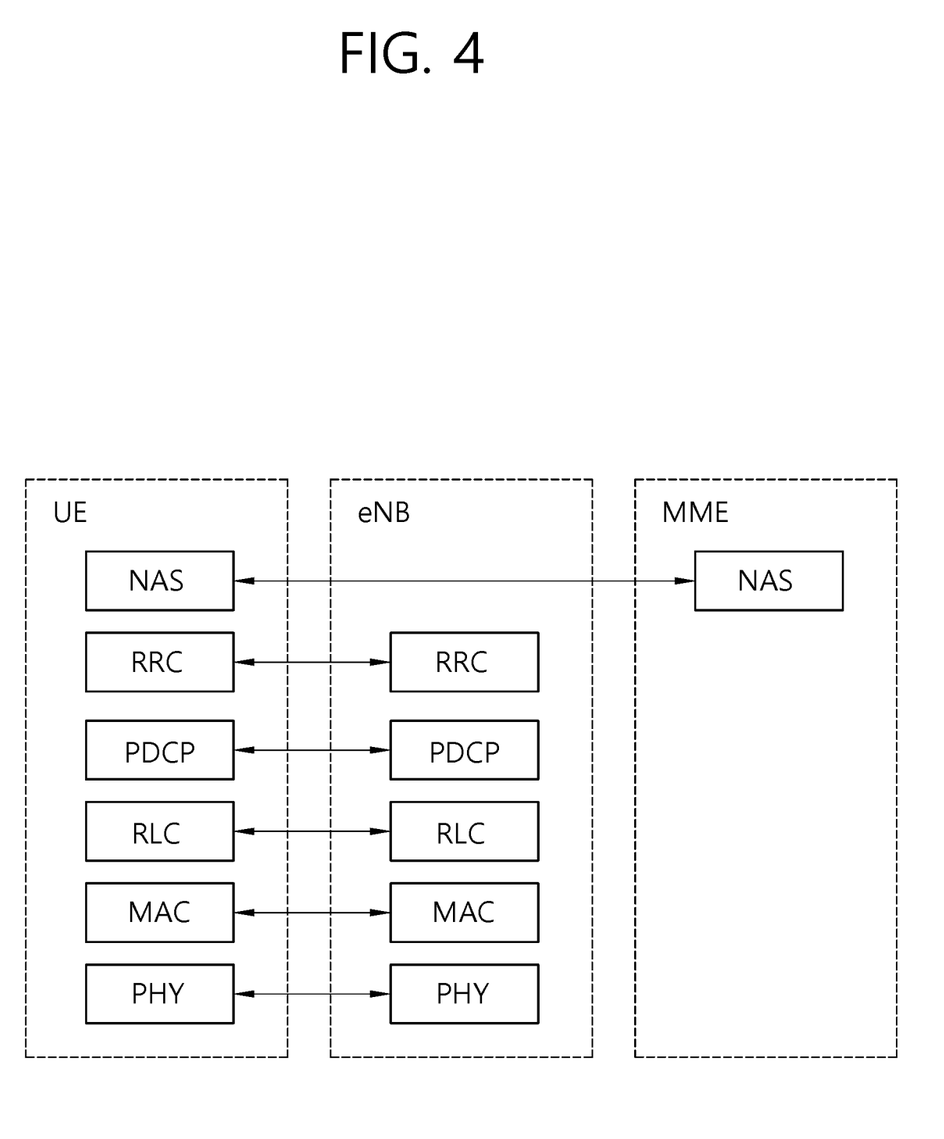
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
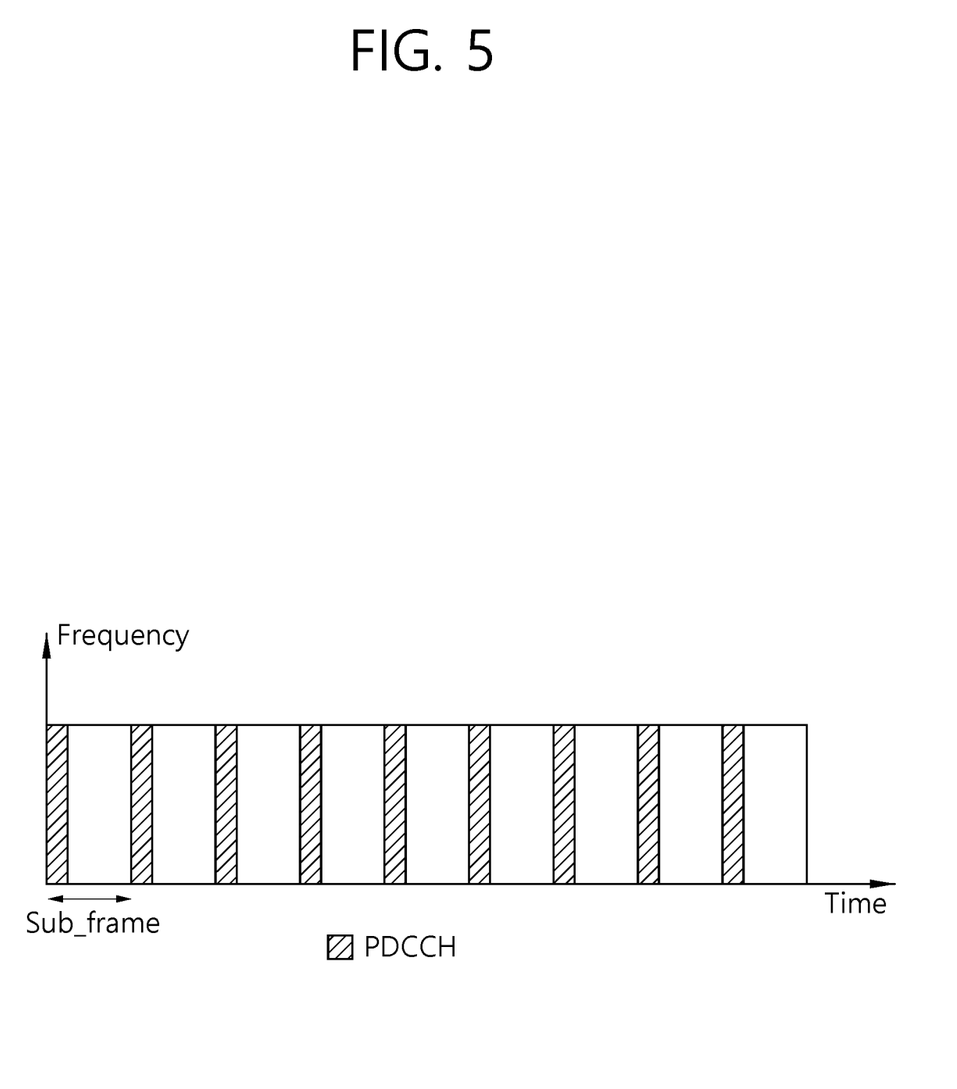
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Discontinuous reception (DRX) is described. It may be referred to Section 12 of 3GPP TS 36.300 V12.5.0 (2015-03). In order to enable reasonable UE battery consumption, DRX in E-UTRAN is characterized by the following:

Per UE mechanism (as opposed to per radio bearer);

No RRC or MAC substate to distinguish between different levels of DRX;

Available DRX values are controlled by the network and start from non-DRX up to x seconds. Value x may be as long as the paging DRX used in evolved packet system (EPS) connection management (ECM) idle mode (ECM-IDLE);

Measurement requirement and reporting criteria can differ according to the length of the DRX interval, i.e. long DRX intervals may experience more relaxed requirements;

Irrespective of DRX, UE may use first available RACH opportunity to send an UL measurement report;

HARQ operation related to data transmission is independent of DRX operation and the UE wakes up to read the PDCCH for possible retransmissions and/or ACK/NAK signalling regardless of DRX. In the downlink, a timer is used to limit the time the UE stays awake awaiting for a retransmission;

When DRX is configured, the UE may be further configured with an "on-duration" timer during which time the UE monitors the PDCCHs for possible allocations;

When DRX is configured, periodic channel quality indicator (CQI) reports can only be sent by the UE during the "active-time". RRC can further restrict periodic CQI reports so that they are only sent during the on-duration;

A timer per timing advance group (TAG) in the UE is used to detect need for obtaining timing advance for each TAG.

The following definitions apply to DRX in E-UTRAN:

on-duration: duration in downlink subframes that the UE waits for, after waking up from DRX, to receive PDCCHs. If the UE successfully decodes a PDCCH, the UE stays awake and starts the inactivity timer;

inactivity-timer: duration in downlink subframes that the UE waits to successfully decode a PDCCH, from the last successful decoding of a PDCCH, failing which it re-enters DRX. The UE shall restart the inactivity timer following a single successful decoding of a PDCCH for a first transmission only (i.e. not for retransmissions).

active-time: total duration that the UE is awake. This includes the "on-duration" of the DRX cycle, the time UE is performing continuous reception while the inactivity timer has not expired and the time UE is performing continuous reception while waiting for a DL retransmission after one HARQ round trip time (RTT). Based on the above the minimum active time is of length equal to on-duration, and the maximum is undefined (infinite);

Of the above parameters the on-duration and inactivity-timer are of fixed lengths, while the active-time is of varying lengths based on scheduling decision and UE decoding success. Only on-duration and inactivity-timer duration are signaled to the UE by the eNB:

There is only one DRX configuration applied in the UE at any time;

UE shall apply an on-duration on wake-up from DRX sleep;

New transmissions can only take place during the active-time (so that when the UE is waiting for one retransmission only, it does not have to be "awake" during the RTT).

If PDCCH has not been successfully decoded during the on-duration, the UE shall follow the DRX configuration (i.e. the UE can enter DRX sleep if allowed by the DRX configuration). This applies also for the sub-frames where the UE has been allocated predefined resources.

If it successfully decodes a PDCCH for a first transmission, the UE shall stay awake and start the inactivity timer (even if a PDCCH is successfully decoded in the sub-frames where the UE has also been allocated predefined resources) until a MAC control message tells the UE to re-enter DRX, or until the inactivity timer expires. In both cases, the DRX cycle that the UE follows after re-entering DRX is given by the following rules. If a short DRX cycle is configured, the UE first follows the short DRX cycle and after a longer period of inactivity the UE follows the long DRX cycle. Else, the UE follows the long DRX cycle directly.

When the UE is in RRC_IDLE, the UE may perform a paging operation for receiving mobile terminating (MT) calls and a TAU operation for network reachability update, according to DRX cycle. The purpose of paging procedure is to transmit paging information to a UE in RRC_IDLE and/or to inform UEs in RRC_IDLE and UEs in RRC_CONNECTED about a system information change and/or to inform about an earthquake and tsunami warning system (ETWS) primary notification and/or ETWS secondary notification and/or to inform about a commercial mobile alert system (CMAS) notification. The paging information is provided to upper layers, which in response may initiate RRC connection establishment, e.g. to receive an incoming call.

E-UTRAN initiates the paging procedure by transmitting the Paging message at the UE's paging occasion. E-UTRAN may address multiple UEs within the Paging message by including one PagingRecord for each UE. E-UTRAN may also indicate a change of system information, and/or provide an ETWS notification or a CMAS notification in the Paging message. Upon receiving the Paging message, the UE shall:

1> if in RRC_IDLE, for each of the PagingRecord, if any, included in the Paging message:

2> if the ue-Identity included in the PagingRecord matches one of the UE identities allocated by upper layers:

3> forward the ue-Identity and the cn-Domain to the upper layers;

1> if the systemInfoModification is included:

2> re-acquire the required system information using the system information acquisition procedure.

1> if the etws-Indication is included and the UE is ETWS capable:

2> re-acquire SystemInformationBlockType1 immediately, i.e. without waiting until the next system information modification period boundary;

2> if the schedulingInfoList indicates that SystemInformationBlockType10 is present:

3> acquire SystemInformationBlockType10;

2> if the schedulingInfoList indicates that SystemInformationBlockType11 is present:

3> acquire SystemInformationBlockType11;

1> if the cmas-Indication is included and the UE is CMAS capable:

2> re-acquire SystemInformationBlockType1 immediately, i.e., without waiting until the next system information modification period boundary;

2> if the schedulingInfoList indicates that SystemInformationBlockType12 is present:

3> acquire SystemInformationBlockType12;

1> if in RRC_IDLE, the eab-ParamModification is included and the UE is EAB capable:

2> consider previously stored SystemInformationBlockType14 as invalid;

2> re-acquire SystemInformationBlockType1 immediately, i.e. without waiting until the next system information modification period boundary;

2> re-acquire SystemInformationBlockType14 using the system information acquisition procedure;

The UE may use DRX in idle mode in order to reduce power consumption. One paging occasion (PO) is a subframe where there may be paging radio network temporary identity (P-RNTI) transmitted on PDCCH addressing the paging message. One paging frame (PF) is one radio frame, which may contain one or multiple PO(s). When DRX is used, the UE needs only to monitor one PO per DRX cycle.

PF and PO is determined by using the DRX parameters provided in system information. PF is given by equation, SFN mod T=(T div N)*(UE_ID mod N). Index i_s pointing to PO from subframe pattern defined Table 1 and Table 2 will be derived from calculation, i_s=floor(UE_ID/N) mod Ns. Table 1 shows subframe patterns for FDD and Table 2 shows subframe patterns for TDD (all UL/DL configurations).

TABLE 1

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

System information DRX parameters stored in the UE shall be updated locally in the UE whenever the DRX parameter values are changed in SI. If the UE has no international mobile subscriber identity (IMSI), for instance when making an emergency call without universal subscriber identification module (USIM), the UE shall use as default identity UE_ID=0 in the PF and i_s formulas above.

The following parameters are used for the calculation of the PF and i_s:

T: DRX cycle of the UE. T is determined by the shortest of the UE specific DRX value, if allocated by upper layers, and a default DRX value broadcast in system information. If UE specific DRX is not configured by upper layers, the default value is applied.

nB: 4T, 2T, T, T/2, T/4, T/8, T/16, T/32.

N: min(T,nB)

Ns: max(1,nB/T)

UE_ID: IMSI mod 1024.

IMSI is given as sequence of digits of type integer (0..9), IMSI shall in the formulae above be interpreted as a decimal integer number, where the first digit given in the sequence represents the highest order digit. For example, when IMSI=12 (digit1=1, digit2=2), in the calculations, this shall be interpreted as the decimal integer "12", not "1×16+ 2=18".

In Rel-12, 3GPP adopted a NAS layer defined power saving mode (PSM) solution for power consumption enhancement. PSM allows the UE to save battery by negotiating with the network periods for which the UE becomes unreachable, in which case the UE stops access stratum activities. The UE exits this mode when it has mobile originated data pending, or when the periodic TAU timer expires.

However, PSM has limited applicability for unscheduled MT data with some requirement on delay tolerance. In this case, the UE would need to negotiate periodic TAU timer equal (or slightly shorter) than the maximum allowed delay tolerance for MT data. If the maximum allowed delay tolerance is not in the order of many hours, the PSM solution introduces an important increase in signalling due to more frequent periodic TAU procedures. It also suffers in terms of power consumption performance because the UE would be required to "wake up" very frequently in order to perform this signalling. Furthermore, for MT data that is infrequent, most of the wake up procedures would turn out to be entirely unnecessary and thus power inefficient.

A more flexible approach that addresses the scenarios not suitable for PSM such as the one described above is to enhance DRX operation. Unlike PSM, DRX makes the UE reachable during pre-defined occasions without resulting in unnecessary signaling.

As currently defined, however, DRX cycles in LTE can at most be 2.56 s and thus would not allow for sufficient power savings for UEs that only need to wake-up infrequently (e.g. every few or tens of minutes) for MT data.

Hence, extended DRX (eDRX) cycle is required in order to enable significant battery savings for such UEs. Furthermore, the DRX cycle can be set depending on the data delay tolerance and power saving requirements, thus providing a flexible solution for achieving significant UE battery savings.

That is, extending the DRX cycle in scenarios where MT data has a delay tolerance in the order of minutes to an hour has been discussed. Idle mode DRX cycles may be extended in order to provide at least an order of magnitude power savings for UEs in idle mode. Further, connected mode DRX cycles may be extended in order to enable additional power savings beyond what is currently possible for UEs in connected mode. By eDRX, the DRX cycle for both idle and connected mode may be extended beyond 2.56 s and up to values to be determined by the network.

However, the existing system frame number (SFN) numbering cannot support a DRX cycle extended to a value beyond 10.24 s, since the SFN can be numbered up to only 1024. Thus, if a DRX cycle is extended to a value beyond 10.24 s, a cell may need to provide extension of SFN. The extension of SFN may be called a hyper SFN (HSFN). Namely, if a certain cell does not support extension of SFN or HSFN, extension of a DRX cycle should be limited to a value below 10.24 s. For efficient eDRX operation, some indication transmitted from the UE to the network may be required.

In order to solve the problem described above, a method for performing eDRX operation based on an uplink indication according to an embodiment of the present invention is proposed. According to an embodiment of the present invention, the UE may transmit an uplink indication related to eDRX operation to the network. Upon receiving the uplink indication from the UE, the network may perform eDRX operation efficiently. In the description below, eDRX in idle mode may be focused for the sake of convenience. However, the present invention is not limited thereto, and may also be applied to eDRX in connected mode.

Figure 6:
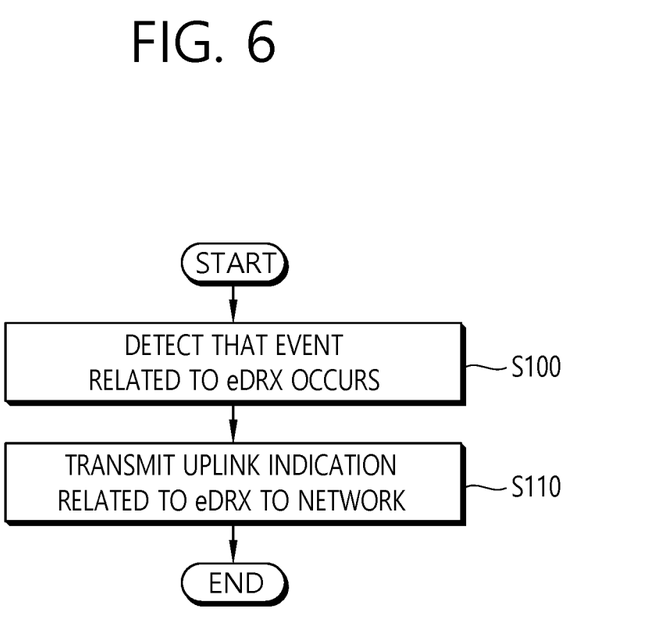
FIG. 6 shows a method for transmitting, by a user equipment (UE), an uplink indication for extended discontinuous reception (eDRX) according to an embodiment of the present invention.

FIG. 6 shows a method for transmitting, by a user equipment (UE), an uplink indication for extended discontinuous reception (eDRX) according to an embodiment of the present invention.

In step S100, the UE detects that an event related to eDRX occurs. In step S110, the UE transmits an uplink indication related to eDRX to a network.

The event related to eDRX may be that an eDRX timer expires or an eDRX command indicating stop of eDRX is received. In this case, the uplink indication indicates stop of eDRX. Upon transmitting the uplink indication indicating stop of eDRX, the UE may start an on-duration timer for eDRX. Further, the UE may trigger a buffer status reporting (BSR) and a scheduling request (SR) towards the network when UE is in RRC_CONNECTED. Further, the UE may trigger transmission of a NAS service request or an RRC connection request towards the network when UE is in RRC_IDLE. In summary, while being at a serving cell where extension of SFN is not supported, the UE configured for eDRX cycle beyond 10.24 s may transmit an uplink indication to the network either every eDRX cycle (e.g. whenever eDRX cycle stops) or when UE leaves eDRX operation (e.g. upon expiry of eDRX timer).

The event related to eDRX may be that no uplink data is to be transmitted. In this case, the uplink indication indicates start of eDRX. Upon transmitting the uplink indication indicating start of eDRX, the UE may start an eDRX timer. Further, the UE may release or deactivate all secondary cells (SCells) and all secondary cell group (SCG) cells including a primary SCell (PSCell). Further, the UE may stop an on-duration timer, a DRX inactivity timer and a DRX short cycle timer. In summary, when the UE detects no uplink data to be transmitted (i.e. no data available for transmission in UL buffers for all logical channels), the UE configured for eDRX may indicate/request eDRX operation to the network by transmitting the uplink indication.

The uplink indication is transmitted via one of a physical uplink control channel (PUCCH), a random access, a MAC control element (CE), a MAC header or an RRC message. The uplink indication may include a UE identity.

Further, when the UE prefers eDRX operation, the UE may transmit a power preference indication message indicating eDRX. The UE may receive an eDRX configuration from the network.

Figure 7:
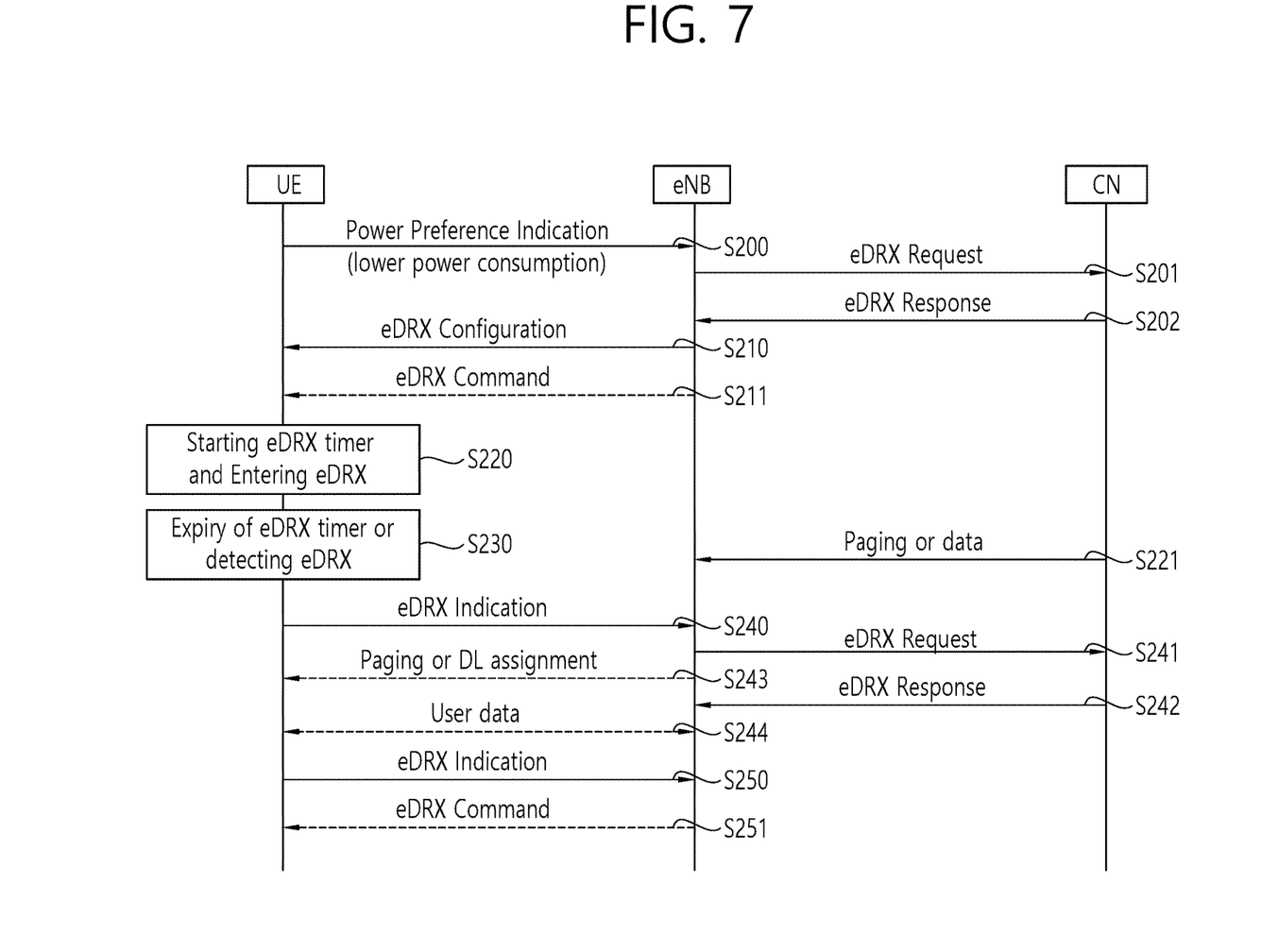
FIG. 7 shows an eDRX procedure for a UE in RRC_IDLE or RRC_CONNECTED according to an embodiment of the present invention.

FIG. 7 shows an eDRX procedure for a UE in RRC_IDLE or RRC_CONNECTED according to an embodiment of the present invention. In this embodiment, eDRX cycle may be a paging DRX cycle for RRC_IDLE and one of MAC level DRX cycles for RRC_CONNECTED.

Before performing eDRX, the UE may verify whether a serving cell or a serving PLMN (either registered PLMN or selected PLMN) supports an eDRX cycle which is extended to a value beyond 2.56 s. The UE may verify this characteristic based on one of system information broadcast by the serving cell, a UE dedicated RRC message, a NAS message transmitted by the MME, an application message transmitted by an application server, or open mobile alliance (OMA) signaling. Upon verifying, the UE may be configured to perform eDRX if the serving cell supports eDRX or the serving PLMN supports eDRX.

If the serving cell or the serving PLMN supports eDRX, in step S200, the UE may transmit a power preference indication message to inform the eNB that the UE has preference for eDRX. For instance, the power preference indication message may indicate 'lower power consumption' for preference for eDRX. Upon receiving the power preference indication message from the UE, in step S201, the eNB may request eDRX operation of the UE to CN. In step S202, the CN may transmit an eDRX response to the eNB.

If the UE is configured for eDRX, in step S210, the eNB transmits an eDRX configuration to the UE. The eDRX configuration may be an RRC message. Then, upon receiving the eDRX configuration, the UE is configured for eDRX. eDRX cycle or eDRX timer value may be configured by the eDRX configuration.

In step S211, the eNB may also transmit an eDRX command, such as eDRX MAC CE, to start eDRX or to stop eDRX for the UE in RRC_CONNECTED.

Upon receiving the eDRX configuration or eDRX command indicating eDRX start, in step S220, the UE starts eDRX timer and enters eDRX. Upon entering eDRX, the UE may monitor paging or PDCCH according to eDRX cycle which is longer than a normal DRX cycle.

Further, when the UE is configured for eDRX or the eDRX command is transmitted to the UE, the eNB may inform the CN that the UE starts eDRX operation. Thus, the CN, such as S-GW, may buffer user traffic towards the UE.

Further, upon entering eDRX, i.e. upon receiving the eDRX command indicating eDRX start, upon starting eDRX timer, or upon using eDRX cycle, the UE in RRC_CONNECTED may stop at least one of on-duration timer, DRX inactivity timer or DRX short cycle timer. The UE in RRC_CONNECTED may also deactivate or release all SCells, deactivate or release all cells in SCG, stop the SCell deactivation timer associated with the SCell, or flush all HARQ buffers associated with the SCell.

Further, while the eDRX timer is running or eDRX cycle is used, the UE in RRC_CONNECTED shall not transmit a sounding reference signal (SRS), not report CQI/precoding matrix indicator (PMI)/rank indicator (RI)/precoding type indicator (PTI), not transmit on UL-SCH, not transmit on RACH, not monitor the PDCCH.

The eDRX timer may expire or UL data to be transmitted may be detected. Accordingly, in step S230, the UE stops using eDRX and stops the eDRX timer.

If the eDRX timer expires or if an eDRX command, e.g. eDRX command MAC CE, indicating eDRX stop is received, in step S240, the transmits an eDRX indication to the network. The eDRX indication may indicate eDRX stop. Further, the UE may start the on-duration timer. If the UE is in RRC_CONNECTED, transmission of eDRX indication may trigger BSR and SR. The SR may be used as the eDRX indication. If UE is in RRC_IDLE, transmission of eDRX indication may trigger transmission of NAS service request or RRC connection request. The UE may perform random access if PUCCH resource is not allocated.

Alternatively, if a scheduling request is triggered, the UE may stop the eDRX timer and stop using the eDRX cycle. And, the UE may also trigger transmission of the eDRX indication. If random access is used, UE may select a physical random access channel (PRACH) preamble from a preamble set configured for eDRX indication. The preamble set may be configured by the network via system information or a UE dedicated message.

Alternatively, if uplink transmission of an RRC message is triggered, e.g. in RRC connection establishment, handover or measurement report, the UE may stop the eDRX timer and stop using the eDRX cycle. And, the UE may also trigger transmission of the eDRX indication.

Alternatively, if a certain MAC CE (e.g. DRX command MAC CE, long DRX command MAC CE, activation/deactivation MAC CE, timing advance command MAC CE) is received, the UE may stop the eDRX timer and stop using the eDRX cycle. And, the UE may also trigger transmission of the eDRX indication.

The eDRX indication may be transmitted via one of a PUCCH, random access, a MAC CE, MAC header, or an RRC message. The eDRX indication may include a UE identity such as IMSI, SAE-temporary mobile subscriber identity (S-TMSI), and C-RNTI. A new logical channel ID (LCID) value in MAC may be used to address the eDRX indication.

When the eDRX indication indicating eDRX stop is received from the UE, the eNB may inform the CN that the UE stops eDRX operation. Thus, the CN, such as S-GW, may not buffer user traffic towards the UE. In step S241, the eNB may transmit an eDRX request to the CN. In step S242, the CN may transmit an eDRX response to the CN. In step S243, the eNB may transmit paging or DL assignment to the UE, and in step S244, user data may be exchanged between the UE and the eNB.

When the UE detects no uplink data to be transmitted (i.e. no data available for transmission in UL buffers for all logical channels), in step S250, the UE transmit the eDRX indication. The eDRX indication may indicate eDRX start. Further, the UE may start eDRX timer or use eDRX cycle.

Upon receiving the eDRX indication indicating eDRX start, if there is no data for downlink transmission, in step S251, the eNB may transmit an eDRX command such as eDRX command MAC CE indicating eDRX start. Upon receiving the eDRX command indicating eDRX start, upon transmitting the eDRX indication indicating eDRX start, upon starting eDRX timer or upon using eDRX cycle, the UE in RRC_CONNECTED may stop at least one of the on-duration timer, DRX inactivity timer or DRX short cycle timer.

Figure 8:
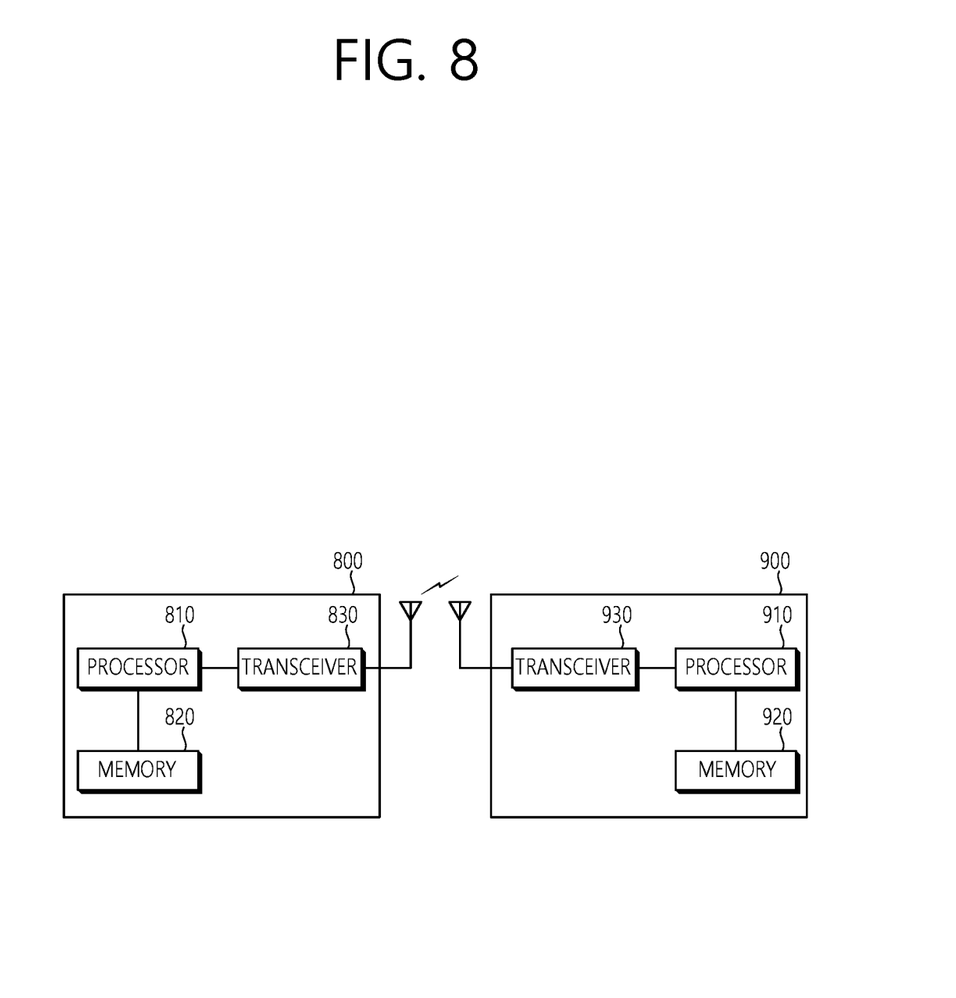
FIG. 8 shows a wireless communication system to implement an embodiment of the present invention.

FIG. 8 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. That is, the processor 910 may detect that an event related to eDRX occurs, and control the transceiver 930 to transmit an uplink indication related to eDRX to a network. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a user equipment (UE) in a wireless communication system, the method comprising:
   transmitting a power preference indication message indicating an extended discontinuous reception (eDRX) to a serving cell,
   wherein the power preference indication message indicates that the UE has a lower power consumption preference for the eDRX;
   receiving a configuration of the eDRX,
   wherein a cycle of the eDRX is longer than a cycle of a normal DRX;
   receiving system information, which informs that a serving cell does not support the eDRX, from the serving cell;
   starting an eDRX timer based on the configuration; and
   transmitting an eDRX indication indicating that the eDRX timer is expired, upon expiry of the eDRX timer,
   wherein the eDRX indication is transmitted via a physical uplink control channel (PUCCH),
   wherein, after transmitting the eDRX indication, all secondary cells (SCells) and all secondary cell group (SCG) cells including a primary SCell (PSCell) are released or deactivated, and
   wherein, after transmitting the eDRX indication, all of an on-duration timer, a DRX inactivity timer and a DRX short cycle timer are stopped.

2. The method of claim 1, further comprising:
   starting an on-duration timer for eDRX.

3. The method of claim 1, further comprising:
   triggering a buffer status reporting (BSR) and a scheduling request (SR) towards the serving cell when the UE is in a radio resource control (RRC) connected mode.

4. The method of claim 1, further comprising:
   triggering transmission of a non-access stratum (NAS) service request or an RRC connection request towards the serving cell when the UE is in an RRC idle mode.

5. The method of claim 1, further comprising:
   detecting that an event related to the eDRX, which is that no uplink data is to be transmitted; and
   transmitting an uplink message related to the eDRX, which informs that the eDRX is started, to the serving cell.

6. The method of claim 1, wherein the eDRX indication is transmitted every eDRX cycle.

7. The method of claim 1, wherein the eDRX indication includes a UE identity.

8. A user equipment (UE) in a wireless communication system, the UE comprising:

a memory;
a transceiver; and
a processor, operatively coupled to the memory and the transceiver,
wherein the processor is configured to:
control the transceiver to transmit a power preference indication message indicating an extended discontinuous reception (eDRX) to a serving cell,
wherein the power preference indication message indicates that the UE has a lower power consumption preference for the eDRX,
control the transceiver to receive a configuration of the eDRX,
wherein a cycle of the eDRX is longer than a cycle of a normal DRX;
control the transceiver to receive system information, which informs that a serving cell does not support the eDRX, from the serving cell;
starting an eDRX timer based on the configuration; and
control the transceiver to transmit an eDRX indication indicating that the eDRX timer is expired, upon expiry of the eDRX timer,
wherein the eDRX indication is transmitted via a physical uplink control channel (PUCCH),
wherein, after transmitting the eDRX indication, all secondary cells (SCells) and all secondary cell group (SCG) cells including a primary SCell (PSCell) are released or deactivated, and
wherein, after transmitting the eDRX indication, all of an on-duration timer, a DRX inactivity timer and a DRX short cycle timer are stopped.

* * * * *